United States Patent
Kim et al.

(10) Patent No.: US 6,704,354 B1
(45) Date of Patent: Mar. 9, 2004

(54) METHOD AND APPARATUS OF PROVIDING ADAPTIVE EQUALIZATION USING SIGN PERMUTATION FILTERING

(75) Inventors: Yeong-Taeg Kim, Milpitas, CA (US); Myeong-Hwan Lee, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/301,021

(22) Filed: Apr. 28, 1999

Related U.S. Application Data

(60) Provisional application No. 60/104,647, filed on Oct. 16, 1998.

(51) Int. Cl.[7] ............................. H03H 7/30; G06F 17/10
(52) U.S. Cl. ..................... 375/229; 375/232; 708/322
(58) Field of Search .................... 375/225, 232, 375/233, 231, 230, 234; 333/28 R, 18; 708/322, 323

(56) References Cited

U.S. PATENT DOCUMENTS

| | | |
|---|---|---|
| 4,371,902 A | 2/1983 | Baxter et al. |
| 4,539,662 A | 9/1985 | Hatano et al. |
| 4,802,033 A | 1/1989 | Chi |
| 4,811,135 A | 3/1989 | Janz |
| 4,823,212 A | 4/1989 | Knowles et al. |
| 4,890,172 A | 12/1989 | Watt et al. |
| 4,937,689 A | 6/1990 | Seaver et al. |
| 4,977,472 A | 12/1990 | Volz et al. |
| 4,982,295 A | 1/1991 | Yakuwa et al. |
| 5,036,408 A | 7/1991 | Leis et al. |
| 5,050,146 A | 9/1991 | Richgels et al. |
| 5,053,899 A | 10/1991 | Okawa et al. |
| 5,182,684 A | 1/1993 | Thomas et al. |
| 5,210,662 A | 5/1993 | Nishijima |
| 5,235,478 A | 8/1993 | Hoshimi et al. |
| 5,255,136 A | 10/1993 | Machado et al. |
| 5,291,110 A | 3/1994 | Andrews, Jr. et al. |

(List continued on next page.)

FOREIGN PATENT DOCUMENTS

| | | |
|---|---|---|
| EP | 0601855 A2 | 6/1994 |
| EP | 0601855 A3 | 6/1994 |
| EP | 0663766 A1 | 7/1995 |
| EP | 0717559 A2 | 6/1996 |
| EP | 0717559 A3 | 6/1996 |
| EP | 0 718 827 A2 | 6/1996 |
| GB | 2 285 165 A | 6/1995 |
| GB | 2 307 089 A | 5/1997 |
| GB | 2 308 488 A | 6/1997 |
| WO | WO 95/24035 | 9/1995 |
| WO | WO 96/23305 | 8/1996 |

*Primary Examiner*—Khai Tran
(74) *Attorney, Agent, or Firm*—Irell & Manella LLP; Jeffrey P. Aiello

(57) ABSTRACT

The present invention is a system and system for equalizing a signal in a communication system. The signal is represented by samples at a time instant, and the samples are filtered using a sign permutation filter. An estimate of the signal is determined by a linear combination of the samples with corresponding weights. The error of the estimate is then computed. The weights are updated by an updating circuit to minimize the error.

30 Claims, 6 Drawing Sheets

U.S. PATENT DOCUMENTS

| | | | |
|---|---|---|---|
| 5,293,401 A | * 3/1994 | Serfaty | 375/231 |
| 5,333,140 A | 7/1994 | Moraru et al. | |
| 5,408,367 A | 4/1995 | Emo | |
| 5,448,429 A | 9/1995 | Cribbs et al. | |
| 5,450,249 A | 9/1995 | Nagaraj et al. | |
| 5,452,285 A | 9/1995 | Monen | |
| 5,453,887 A | 9/1995 | Negishi et al. | |
| 5,465,034 A | 11/1995 | Andrews, Jr. et al. | |
| 5,465,035 A | 11/1995 | Scaramuzzo, Jr. et al. | |
| 5,499,268 A | * 3/1996 | Takahashi | 375/231 |
| 5,500,776 A | 3/1996 | Smith | |
| 5,523,902 A | 6/1996 | Pederson | |
| 5,570,247 A | 10/1996 | Brown et al. | |
| 5,581,420 A | 12/1996 | Chainer et al. | |
| 5,587,850 A | 12/1996 | Ton-that | |
| 5,590,154 A | * 12/1996 | Forni et al. | 333/28 R |
| 5,600,506 A | 2/1997 | Baum et al. | |
| 5,606,469 A | 2/1997 | Kosugi et al. | |
| 5,608,587 A | 3/1997 | Smith | |
| 5,615,058 A | 3/1997 | Chainer et al. | |
| 5,631,783 A | 5/1997 | Park | |
| 5,640,423 A | 6/1997 | Archer | 375/261 |
| 5,657,179 A | 8/1997 | McKenzie | |
| 5,659,436 A | 8/1997 | Yarmchuk et al. | |
| 5,666,238 A | 9/1997 | Igari et al. | |
| 5,680,270 A | 10/1997 | Nakamura | |
| 5,680,451 A | 10/1997 | Betts et al. | 379/410 |
| 5,691,857 A | 11/1997 | Fitzpatrick et al. | |
| 5,696,647 A | 12/1997 | Phan et al. | |
| 5,710,677 A | 1/1998 | Teng et al. | |
| 5,715,105 A | 2/1998 | Katayama et al. | |
| 5,734,680 A | 3/1998 | Moore et al. | 375/263 |
| 5,748,677 A | 5/1998 | Kumar | 375/285 |
| 5,751,513 A | 5/1998 | Phan et al. | |
| 5,760,992 A | 6/1998 | Phan et al. | |
| 5,771,126 A | 6/1998 | Choi | |
| 5,771,130 A | 6/1998 | Baker | |
| 5,771,131 A | 6/1998 | Pirzadeh | |
| 5,796,543 A | 8/1998 | Ton-That | |
| 5,798,883 A | 8/1998 | Kim | |
| 5,867,337 A | 2/1999 | Shimomura | |
| 5,867,353 A | 2/1999 | Valent | |
| 5,892,634 A | 4/1999 | Ito et al. | |
| 5,901,009 A | 5/1999 | Sri-Jayantha et al. | |
| 5,909,466 A | * 6/1999 | Labat et al. | 375/233 |
| 5,917,670 A | 6/1999 | Scaramuzzo et al. | |
| 5,946,157 A | 8/1999 | Codilian et al. | |
| 6,031,684 A | 2/2000 | Gregg | |
| 6,118,616 A | 9/2000 | Jeong | |
| 6,178,060 B1 | 1/2001 | Liu | |
| 6,320,904 B1 | * 11/2001 | Velez et al. | 375/233 |

* cited by examiner

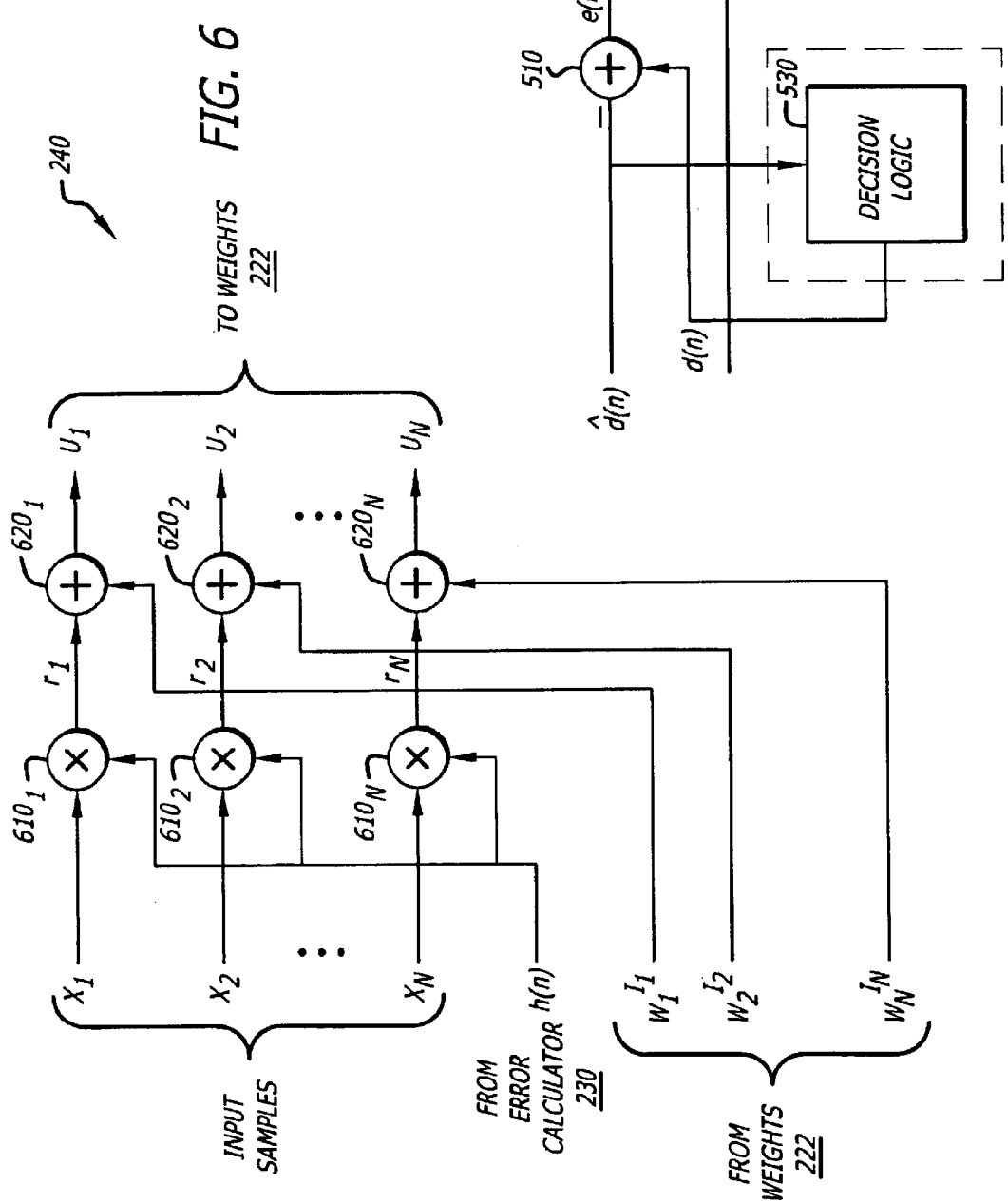

METHOD AND APPARATUS OF PROVIDING ADAPTIVE EQUALIZATION USING SIGN PERMUTATION FILTERING

This Application claims the benefit of U.S. Provisional Application No. 60/104,647, filed Oct. 16, 1998.

BACKGROUND OF THE INVENTION

1. Field of the Invention

This invention relates in general to communication systems, and more particularly, to a method and apparatus for providing adaptive equalization using non-linear digital filters.

2. Description of Related Art

One signal processing technique that is typically used in digital communication systems is channel equalization. The primary goal of equalization is to enhance the performance of a communication system in the presence of channel noise, channel distortion, multipath and multi-user interferences. Applications of channel equalization can be found in the consumer electronics, for example, in digital TV and personal communication systems, where various equalizers are used to increase the signal-to-noise ratio of an incoming signal and/or to reduce the bit error rate of the incoming signal.

Conventional equalization techniques generally rely on the use of linear filters. However, communications channels typically exhibit nonlinear characteristics that result from the existence of impulse noise and nonlinear distortion. In the presence of such nonlinearities, equalizers based on the linear filter theory perform poorly. This subsequently results in reduced system performance.

Accordingly, there is a need in the technology for a method and apparatus for providing adaptive equalization in a communication system, which overcomes a number of the aforementioned problems. There is also a need in the technology for providing adaptive equalization using non-linear filters, that provide robust frequency tracking and are resistant to interference during communications.

BRIEF SUMMARY OF THE INVENTION

The present invention is a method and apparatus for equalizing a signal in a communication system. The signal is represented by samples at a time instant, and the samples are filtered using a sign permutation filter. An estimate of the signal is determined by a linear combination of the samples with corresponding weights. The error of the estimate is then computed. The weights are updated by an updating circuit to minimize the error.

BRIEF DESCRIPTION OF THE DRAWINGS

FIG. 5 illustrates one embodiment of the update factor calculator 230 of FIG. 2, provided in accordance with the principles of the invention.

FIG. 6 illustrates one embodiment of the update circuit 240 of FIG. 2, provided in accordance with the principles of the invention.

DETAILED DESCRIPTION OF THE INVENTION

Figure 1:
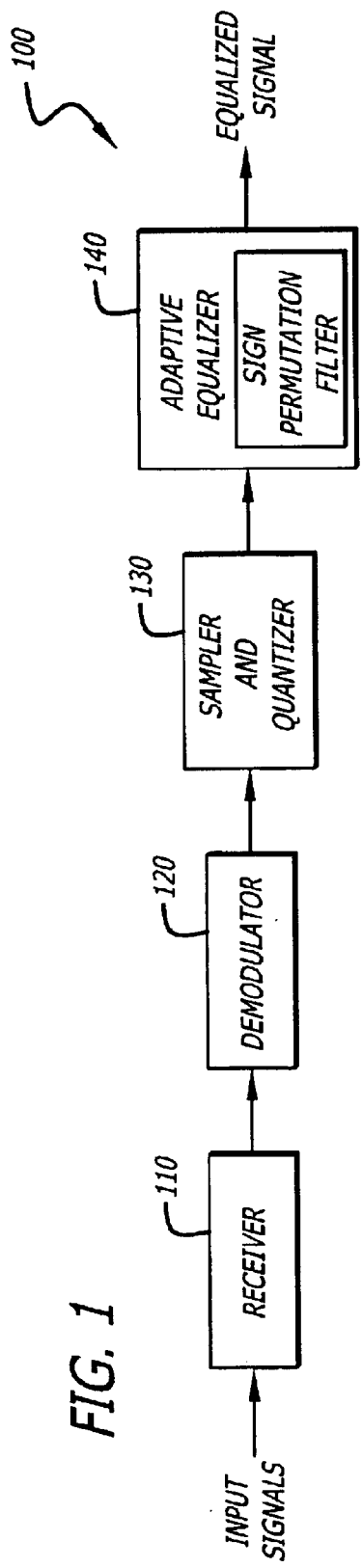
FIG. 1 illustrates one embodiment of a communication system which implements the present invention.

The present invention is a method and apparatus for equalizing a signal using a new, modular class of nonlinear digital filters denoted as sign permutation filters. The present invention-provides a systematic way of utilizing sign permutation information embedded in the underlying signal to produce an output signal that provides robust frequency tracking. The resulting output signal is also resistant to interference.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Principles of Operation

Let the received sample at time instance n be x(n) and its associated N long observation vector as x(n). One example of the observation vector can be given as $$x(n) = [x_1(n), x_2(n), \ldots, x_N(n)]^T \quad (1)$$

$$= [x(n), x(n-1), \ldots, x(n-N+1)]^T, \quad (2)$$

where T denotes the matrix transpose. The location parameters n will be dropped from the notation in the sequence for notational simplicity, and the elements of the observation vector are indexed as $x=[x_1, x_2, \ldots, x_N]^T$.

The sign indicator vector of the ith sample is defined as $$S_i = \begin{bmatrix} sgn(x_i) \\ 1 - sgn(x_i) \end{bmatrix} \quad (3)$$

where $$sgn(x_i) = \begin{cases} 1, & \text{if } x_i \geq 0 \\ 0, & \text{otherwise} \end{cases}. \quad (4)$$

Note that the sign indicator vector simply indicates the sign of the associate sample.

EXAMPLE 1

Given $x=[-2,4,5]^T$, the sign indicator vectors may be expressed as:

$S_1=[0,1]^T$, $S_2=[1,0]^T$ and $S_3=[1,0]^T$.

In order to characterize the joint sign states of a set of samples in selected spatial locations, the sign indicator vectors of these additional samples must be appended to $S_i$. Thus, the sign permutation indicator vector of order J is defined as:

$$P_i^J = S_i \otimes S_{i \oplus 1} \otimes \ldots \otimes S_{i \oplus (J-1)} \quad (5)$$

for i=1, 2, ..., N, where $\otimes$ denotes the matrix Kronecker product, which is defined as:

$$\begin{bmatrix} a_1 \\ a_2 \\ \vdots \\ a_L \end{bmatrix} \otimes b = \begin{bmatrix} a_1 b \\ a_2 b \\ \vdots \\ a_L b \end{bmatrix} \quad (6)$$

in which b is an arbitrary vector, and where $\oplus$ represents the Modulo N addition, i.e., $a \oplus b$ (a+b) Mod N, where the Modulo N operation defined here is in the group {1, 2, ..., N}, such that (N Mod N=N) and ((N+1) Mod N=1).

EXAMPLE 2

Given $x=[-2, 4, 5]^T$, the sign indicator vectors may be expressed as $S_1=[0, 1]^T$ $S_2=[1, 0]^T$ and $S_3 [1, 0]^T$. Furthermore, the sign permutation vector for the sample $x_1$ when J=2 can be obtained as:

$$P_1^2 = S_1 \otimes S_2 \quad (7)$$

$$= [0, 1]^T \otimes [1, 0]^T \quad (8)$$

$$= [0, 0, 1, 1]^T \quad (9)$$

Note that the vector $P_i^J$ in equation (5) has a length of $2^J$, and it effectively discriminates the relative sign permutation of the samples $x_i, x_{i \oplus 1}, \ldots, x_{i \oplus (J-1)}$ among $2^J$ different sign permutations. In other words, the location of the 1 in $P_i^J$ corresponds to one particular event of the joint sign permutation of the samples $x_i, x_{i \oplus 1}, \ldots, x_{i \oplus (J-1)}$.

The sign permutation filter presented here utilizes the sign permutation indicators $P_i^J$ defined in equation (5). These form the basis for the $N2^J$ long sign permutation vector $X_J$ of order J, defined as:

$$X_J = \begin{bmatrix} x_1 P_1^J \\ x_2 P_2^J \\ \vdots \\ x_N P_N^J \end{bmatrix} \quad (10)$$

The output of the sign permutation filter is then given as:

$$\hat{d} = W_J^T X_J \quad (11)$$

where $W_J$ is the weight vector described as:

$$W_J = \begin{bmatrix} w_1^J \\ w_2^J \\ \vdots \\ w_N^J \end{bmatrix} \quad (12)$$

in which $w_i^J = [w_i^1, w_i^2, \ldots, w_i^{2^J}]^T$ for i=1, 2, ..., N, are the $2^J$ long tap weight vectors. By the use of Eq. (10) in Eq. (11), the output of the sign permutation filter can be expressed as:

$$\hat{d} = \sum_{i=1}^{N} (w_i^J)^T P_i^J x_i \quad (13)$$

Hence, the output is obtained by a linear combination of the input samples, where the weight assigned to each sample $x_i$ is determined by the sign permutation indicator $P_i^J$. The parameter J selects the amount of sign information to be utilized in the estimation. For J=0, no sign information is used and the reconstruction reduces to a FIR filter where only the temporal information is utilized. For J=1, the temporal location and the sign information of $x_i$ are used without further consideration of the neighboring samples. J is increased in a modular fashion to J=N where the temporal-sign ordering of all samples is used.

As discussed earlier, the sign permutation filter discriminates the joint sign permutation of the samples $x_i, x_{i \oplus 1}, \ldots, x_{i \oplus (J-1)}$ by the location of 1 in $P_i^J$ which can be noted from its definition given in equation (5). By setting $I_i$ as the location of 1 in $P_i^J$, which is associated with the sign permutation of the samples $x_i, x_{i \oplus 1}, \ldots, x_{i \oplus (J-1)}$, the output of the sign permutation filter given in equation (13) can be expressed as:

$$\hat{d} = \sum_{i=1}^{N} w_i^{I_i} x_i \quad (14)$$

Note that the operation behind $(w_i^J)^T P_i^J$ in equation (13) is to pick up and assign a weight to the sample $x_i$ from the weight vector $w_J$, depending on the sign permutation of the samples $x_i, x_{i \oplus 1}, \ldots, x_{i \oplus (J-1)}$.

In association with the definition of the sign permutation vector given in equation (5), the location of the non-zero element in $P_i^J$ can be simply computed as:

$$I_i = \sum_{j=1}^{J} sgn(x_{i \oplus (j-1)}) 2^{j-1} + 1 \quad (15)$$

A functional structure of the present invention is shown in FIG. 1 and described in the following text, where the location parameters $I_1, I_2$ and $I_N$ are used to determine which set of weights is applied to the input samples. To be specific, $w_1^{I_1}$ is selected from the coefficient bank1 $410_1$ (see FIG. 4), which contains the weight vector $w_1 = \lfloor w_1^1, w_1^2, \ldots, w_1^{2^J} \rfloor$ and multiplied to the sample $x_i$. Similarly, $w_2^{I_2}$ and $w_N^{I_N}$ are selected and multiplied to the input samples $X_2$ and $X_N$, respectively.

In order to apply the sign permutation filters of the present invention in real applications, the optimization of the sign permutation filters is presented next. The theory of linear filter theory may be directly applied to the optimization of the sign permutation filters since the filter consists of a linear combination of the elements of $X_J$. Hence, it is simple to show that the optimal sign permutation filter under the mean square error (MSE) criterion can be found as:

$$W_J^{opt} = R_J^{-1} p_J \quad (16)$$

where $$R_J = E\{X_J X_J^T\} \quad (17)$$

and $$p_J = E\{dX_J\}, \quad (18)$$

in which d denotes a desired output and E(.) represents the statistical expectation. By the use of equation (10) in equation (17), the cross correlation matrix $R_J$ can be estimated as:

$$R_J = \begin{bmatrix} \vdots \\ \cdots E(x_i x_k p_i^J (p_k^J)^T) \cdots \\ \vdots \end{bmatrix}, \quad (19)$$

and the use of equation (10) in equation (18) gives $$p_J = \begin{bmatrix} \vdots \\ E(x_i p_i^J) \\ \vdots \end{bmatrix}. \quad (20)$$

Conditions for the non-singularity of $R_J$ and the linear transformation between $W_j^{opt}$ and $W_{j-p}^{opt}$ for p=1, 2, ..., J are discussed by Y. T. Kim and G. R. Arce in "Permutation Filter Lattices: A General Order Statistic Filtering Framework," *IEEE Trans. On Signal Processing*, September 1994 and by Y. T. Kim, G. R. Arce and N. Grabowski in "Inverse Halftoning Using Permutation Filters", *IEEE Trans. On Image Processing*, September 1995.

Although the statistical moments required for the reconstruction algorithm can be estimated as shown in equations (17) and (18), a simpler method based on Widrow's LMS algorithm is derived next, which enables the adaptive sign permutation filtering in many applications.

As mentioned before, the output of the sign permutation filter is a linear combination of the samples in $X_J$, which implies that the sign permutation filter is a linear filter with respect to the vector $X_J$. Hence, using the LMS adaptation algorithm that can be found in equation [4], the update of the weight vector of the sign permutation filter can be written as:

$$W_J(m+1) = W_J(m) + 2\mu\epsilon(m)X_J(m) \quad (21)$$

where $\epsilon(m) = d - \hat{d}$ is the estimation error at the mth iteration, and where $\mu$ is the step size, which controls the rate of convergence of the algorithm. Under the independence assumption, it is known that for convergence the step size must satisfy $\mu < 1/\lambda_{max}$ where $\lambda_{max}$ is the largest eigenvalue of the matrix $R_J$. The update in equation (21) can be further simplified in terms of the number of weight parameters to be updated at each iteration, by exploiting the structural characteristics of the sign permutation indicator vectors.

Note that every $P_i^j$ has only one non-zero element which is 1 for i=1, 2, ..., N. Thus there are only N non-zero elements of value 1 in $X_J$. By restricting the updates to the weight corresponding to the N non-zero terms in $X_J(m)$, the LMS adaptation in equation (21) can be significantly simplified. Again, denote the location of the non-zero term in $P_i^J$ as $I_i$, then the update equation can be written as:

$$w_i^{I_i}(m+1) = w_i^{I_i}(m) + 2\mu\epsilon(m)x_i, \text{ for } i=1,2,\ldots,N \quad (22)$$

where $w_i^{I_i}(m)$ represents the $I_i$th element of the sub-weight vector $w_i^J$ at the mth iteration. Note that the weight vector update in equation (22) only requires the update of N parameters whereas equation (21) requires the update of $N2^J$ parameters. Thus, the adaptation in equation (22) has the same degree of complexity of a linear filter in terms of number of updates at each iteration.

Discussion of Embodiments and Applications

FIG. 1 illustrates one embodiment of a communication system 100 which implements the present invention. The system 100 includes a receiver 110, a demodulator 120, a sampler and quantizer 130, and an adaptive equalizer 140.

The receiver 110 receives an input signal transmitted from a transmitter (not shown). The input signal may originate from a number of sources, such as radio or television stations, for example. The input signal may be an audio signal or a video signal. The receiver 110 may include a receiver antenna and radio frequency (RF) circuits. The demodulator 120 demodulates the received signal and converts the signal into baseband signal. The demodulator 120 may also include an appropriate filter to eliminate unwanted frequency components and retain the baseband frequency components which include the signal of interest (SOI). The sampler and quantizer 130 samples the baseband signal according to a suitable sampling frequency and quantizes the sampled signal into digital data with appropriate word length.

The adaptive equalizer 140 receives the digital data of the input baseband signal samples and performs an adaptive equalization using a sign permutation filter. The adaptive equalizer 140 essentially forms a group of non-linear digital filters based on the utilization of sign permutation of the input baseband signal. The adaptive equalizer 140 establishes and utilizes the sign permutation information, or, the frequency of zero-crossings embedded in the input baseband signal. The non-linearity characteristic of the adaptive equalizer 140 overcomes the drawbacks of the linear equalization for the non-linear characteristics of a communication channel.

Figure 2:
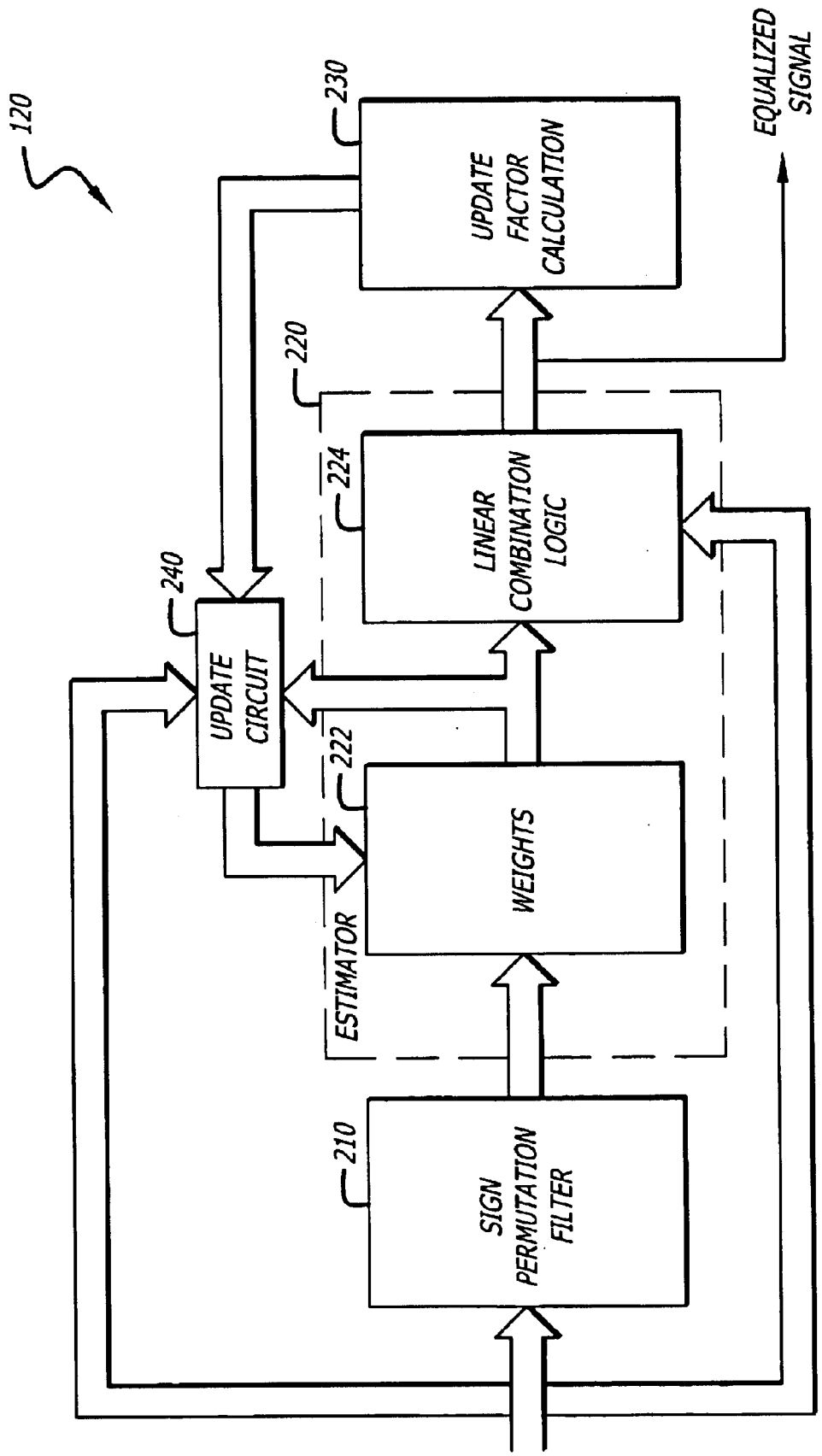
FIG. 2 illustrates one embodiment of the adaptive equalizer of FIG. 1, provided in accordance with the principles of the invention.

FIG. 2 illustrates one embodiment of the adaptive equalizer 140 of FIG. 1 in accordance with the principles of the invention. The adaptive equalizer 140 includes a sign permutation filter 210, an estimator 220, an error calculator 230, and an update circuit 240.

The sign permutation filter 210 performs filtering on the input samples X(n) using a sign permutation indicator. The estimator 220 estimates the input sample using a set of weights or coefficients 222 and a linear combination logic 224. The error calculator 230 computes the error of the estimated sample produced by the estimator 220. The update circuit 240 receives the input samples, the weights, and the error indicator to generate an update to the set of weights 222.

Figure 3:
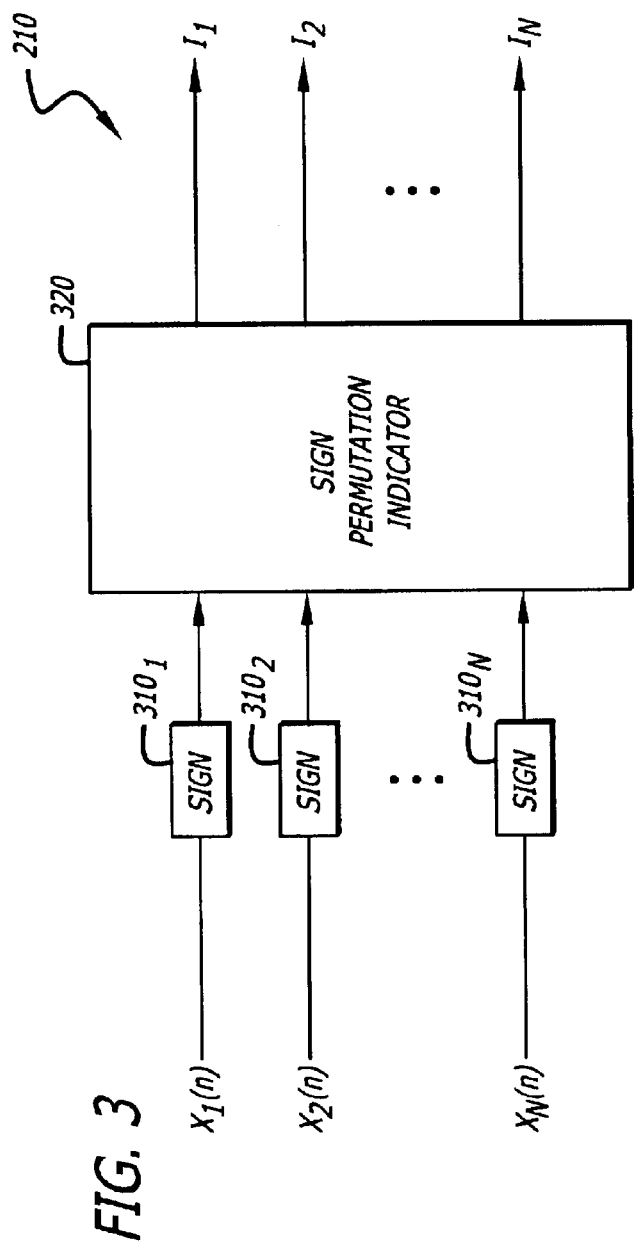
FIG. 3 illustrates one embodiment of the sign permutation filter 210 of FIG. 2 in accordance with the principles of the invention.

FIG. 3 illustrates one embodiment of the sign permutation filter 210 of FIG. 2 in accordance with the principles of the invention. The sign permutation filter 210 includes N sign elements $310_1$ to $310_N$ and a sign permutation indicator 320.

The sign elements $310_1$ to $310_N$ process the N input samples to extract the sign values. The sign element $310_i$ (where i=1, ..., N) computes the sign vector of the ith sample $x_i(n)$ at the time instant N as shown in equations (3) and (4) and expressed as follows:

$$S_i = \begin{bmatrix} sgn(x_i) \\ 1 - sgn(x_i) \end{bmatrix}$$

where $$sgn(x_i) = \begin{cases} 1, & \text{if } x_i \geq 0 \\ 0, & \text{otherwise} \end{cases}.$$

In one embodiment, the sign elements $310_i$ where $i=1, \ldots, N$ (i.e. $310_1$ to $310_N$) may be implemented using a comparator. Alternatively, if the sample $x_i$ is represented in a signed format, e.g. 2's complement, having a sign bit, then the sign bit can be used as the output of the sign element.

The sign permutation indicator 320 generates the values $I_1$ to $I_N$. The value $I_i$ (where $i=1, \ldots, N$) is generated as shown in equation (15) and expressed as:

$$I_i = \sum_{j=1}^{J} sgn(x_{i \oplus (j-1)}) 2^{j-1} + 1.$$

The sign permutation indicator includes a sign permutation vectorizer to generate a vector having a vector length of $2^J$ where J is a positive integer. A relative sign permutator is used to determine the relative sign permutation of the samples among $2^J$ different sign permutations.

Figure 4:
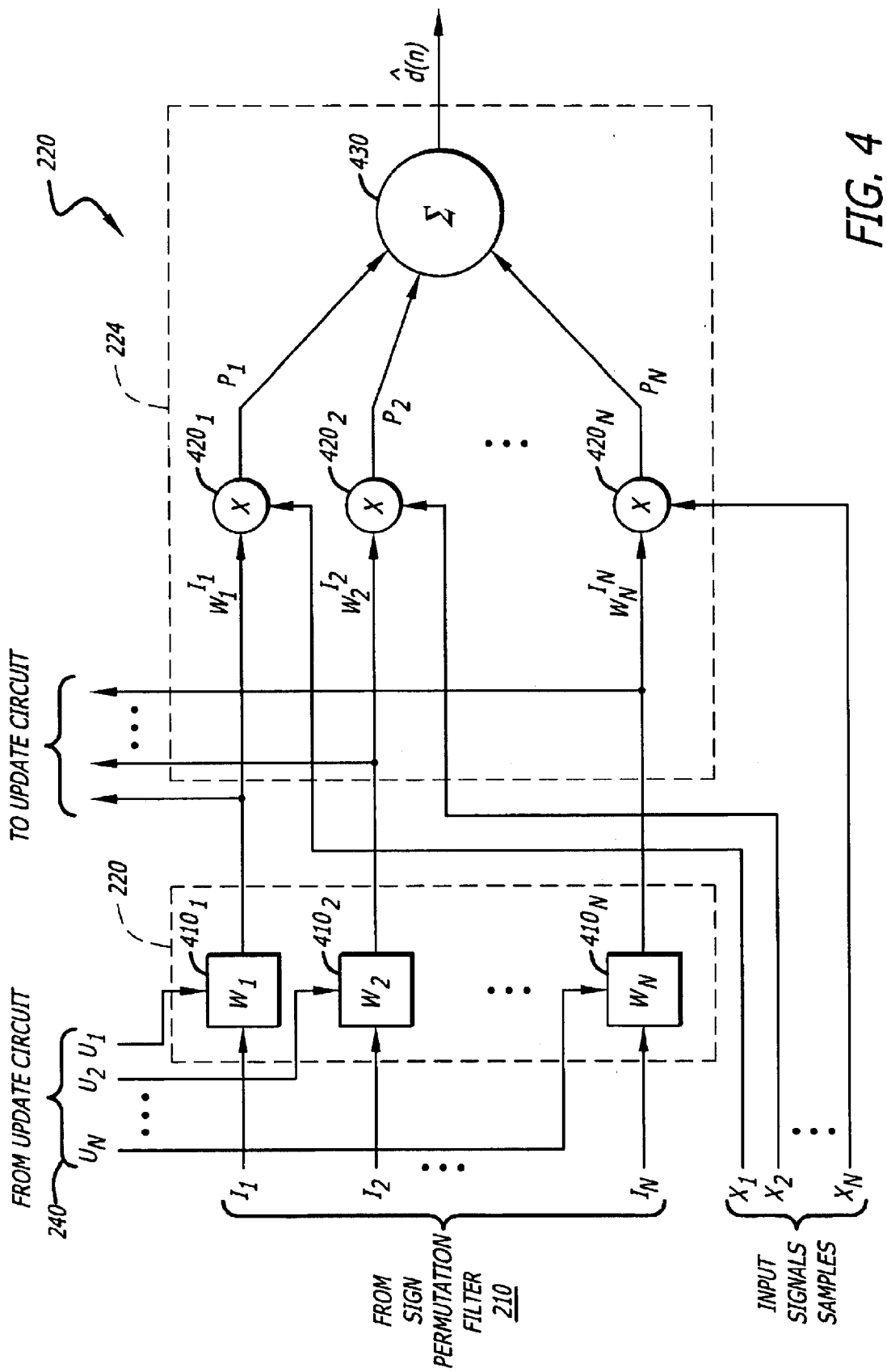
FIG. 4 illustrates one embodiment of the estimator 220 of FIG. 2, provided in accordance with the principles of the invention.

FIG. 4 illustrates one embodiment of the estimator 220 provided in accordance with the principles of the invention. The estimator 220 includes a weight storage 222 and a linear combination logic 224.

The weight storage 222 includes a set of weights $410_1$ to $410_N$. The weights $410_1$ to $410_N$ represent the weights or coefficients used in estimating the input sample. The weights $410_1$ to $410_N$ are updated by the update circuit 240. The weights $410_1$ to $410_N$ receive the location parameters $I_1$ to $I_N$ as generated by the sign permutation filter 210 (see FIG. 2) to determine which set of weights are to be used. In one embodiment, the weight $410_i$ (where $i=1, \ldots, N$) includes a multiplexer that selects a zero weight if the weight is not be used use with the corresponding input sample $x_i$. In one embodiment, each of the weights $410_1$ to $410_N$ is implemented as a storage element (e.g., random access memory) having two write ports, one for the $I_i$ from the sign permutation filter 210 and one for the updated value $u_i$ from the update circuit 240.

The linear combination logic circuit 224 includes multipliers $420_1$ to $420_N$ and a summer 430. Each multiplier $420i$ (where $i=1, \ldots, N$) multiplies the weight selected by the corresponding weights $410i$ and the corresponding input samples $x_i$ to produce a product $P_i$ where $P_i = w_i^{I_i} x_i$. The summer 430 adds all the products $P_i$ to produce the sum $\hat{d}(n)$. The multipliers $420_1$ and $420_N$ and the summer 430 perform a linear combination on the input samples according to equation (14). The linear combination logic 224 produces the estimated sample $\hat{d}(n)$.

FIG. 5 is a diagram illustrating an error calculator 230 according to one embodiment of the invention. The error calculator 230 includes a subtractor 510, a multiplier 520, and an optional decision logic 530.

The subtractor 510 subtracts the estimated sample $\hat{d}(n)$ from a sample $d(n)$. The sample $d(n)$ can be generated in a number of methods. In one embodiment, a training sample is used. In an alternative embodiment, a decision process provided by the decision logic 530 may be used. In one embodiment, the decision logic 530 is a quantizer which quantizes the input to a predetermined discrete signal levels. The subtractor 510 generates the error $e(n)$ between the estimated sample $\hat{d}(n)$ and the expected sample $d(n)$ The multiplier 520 multiples the error $e(n)$ and a constant, referred to as a step size. The step size $\mu$ controls the rate of convergence. In one embodiment this constant is $2\mu$ where $\mu < 1/\lambda_{max}$ where $\lambda_{max}$ is the largest eigenvalue of the matrix $R_J$. The multiplier 520 generates the update factor $h(n)$.

FIG. 6 illustrates one embodiment of the updating circuit 240 of FIG. 2 provided in accordance with the principles of the invention. The update circuit 240 includes multipliers $610_1$ to $610_N$ and adders $620_1$ to $620_N$. The update circuit 240 computes the new values of the weights stored in the weights $410_1$ to $410_N$ (see FIG. 4) according to the equation (22) which may be expressed as:

$$u_i^{I_i}(n) = w_i^{I_i}(n+1) = w_i^{I_i}(n) + 2 \mu e(n) x_i, \text{ for } i=1,2,\ldots,N$$

The multipliers $610_1$ to $610_N$ multiply the input samples with the update factor $h(n)$ generated by the updating circuit 240 to produce the, respective products $r_1(n)$ to $r_N(n)$. The adders $620_1$ to $620_N$ add the products $r_1(n)$ to $r_N(n)$ to the corresponding outputs of the weights 222. The result of the updating includes a set of updated values $u_1$ to $u_N$. These updated values are then transferred to the weight storage 222 to replace the old weight values.

Results

Figure 7:
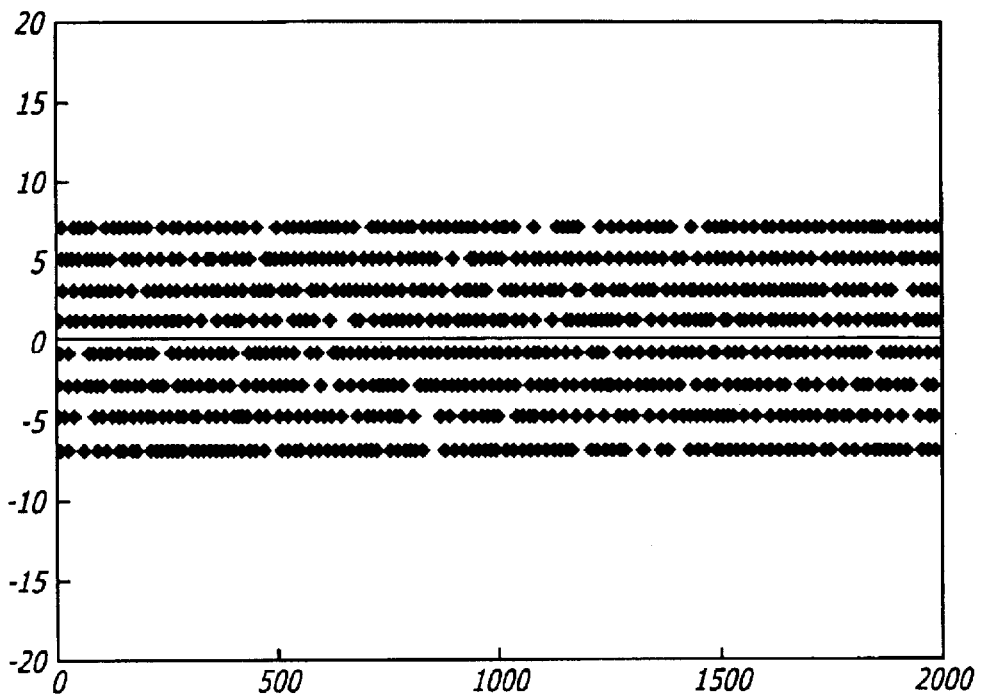
FIG. 7 illustrates an example of an original signal sequence that is being transmitted.
Figure 8:
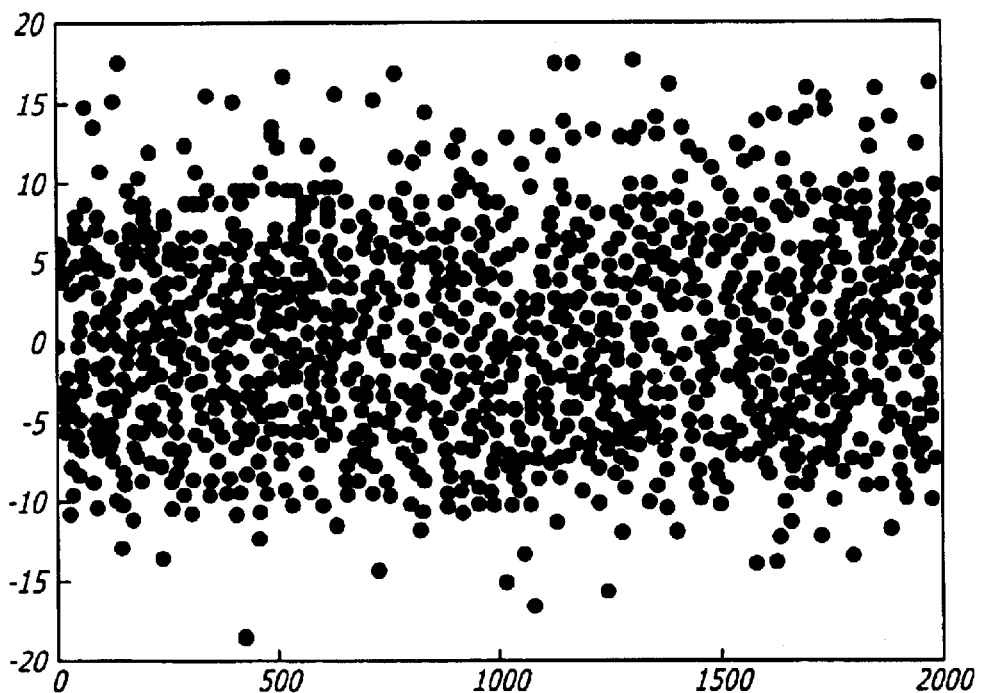
FIG. 8 illustrates the received signal corresponding to the transmitted signal of FIG. 7.
Figure 9:
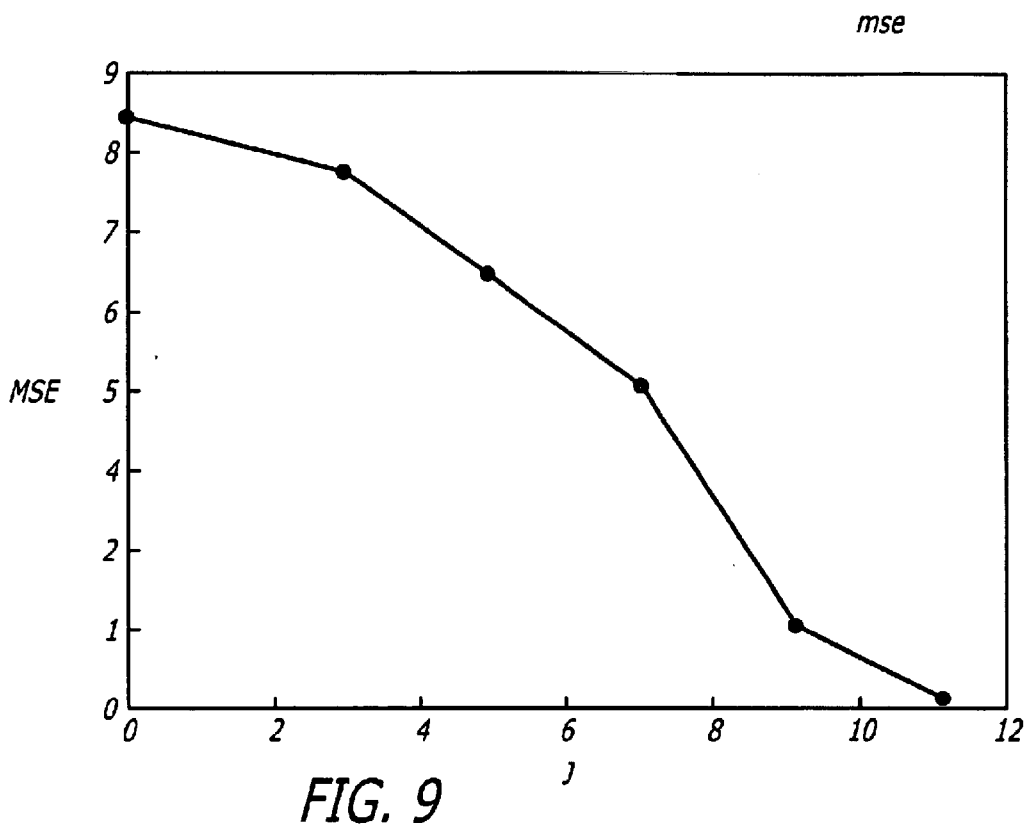
FIG. 9 illustrates the performance of conventional equalizers with different values of J in terms of MSE, where N=11.
Figure 10:
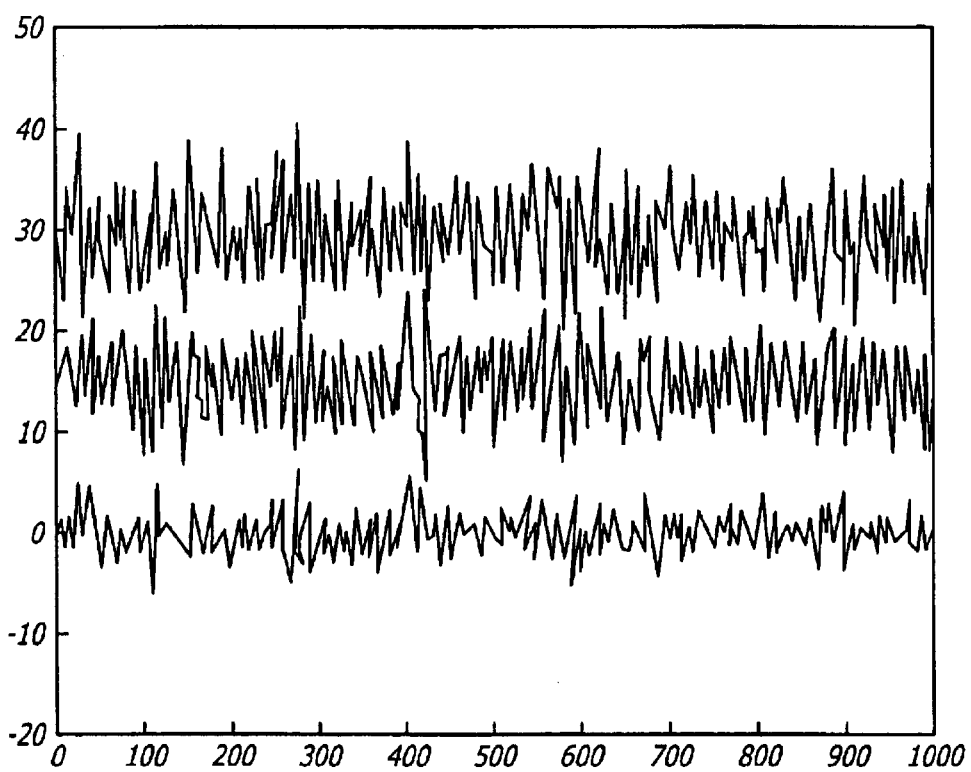
FIG. 10 illustrates the corresponding output signals upon filtering using the sign permutation filter of the present invention, for some values of J when N=11.

In order to illustrate the performance of the present inventions formerly described in real applications, an example in Vestigial Sideband (VSB) demodulation system that is recently adopted as a standard terrestrial digital TV transmission, is used. The adaptive sign permutation equalizer of the invention for the suppression of inter symbol interference and channel noise, where a finite length of training sequence is implemented with the VSB demodulation system. The interference is modeled by the impulse response given by $0.6+0.4_z^{-4}$, and the channel noise was generated as a summation of an additive zero-mean Gaussian noise with variance of 1 and 15% impulses. The desired signal was given by a random 8-level VSB sequence. A data set of 10,000 samples was generated and the MSE between the original and the corrupted signals is 10.15. FIG. 7 shows one part of the original sequence and the FIG. 8 represents the received signal. FIG. 9 shows the performance of the equalizers with different values of J in terms of the MSE where N=11 is used. Note that the less MSE is directly associated with the less bit error rate of the system. The associated output signals for different values of J is shown in FIG. 10.

This result clearly demonstrates the superior performance of the sign permutations equalizers of the present invention over the adaptive equalizers based on the linear filter theory.

The present invention thus provides a technique for performing adaptive equalization on a signal using sign permutation filtering. The technique efficiently processes signals in non-linear noisy channels, provides robust frequency tracking and is resistant to interference during communications.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for equalizing a signal in a digital system, the signal being represented by samples at a time instant, the method comprising:
   filtering the samples using a sign permutation filter;
   determining an estimate of the signal by a linear combination of the samples with corresponding weights using the sign permutations of the samples;

determining an update factor based on an error of the estimate; and updating the weights based on the update factor to minimize the error.

2. The method of claim 1, wherein filtering the samples comprises:

computing sign indicators corresponding to the samples.

3. The method of claim 2, wherein determining an estimate comprises:

selecting the weights based on the sign indicators;

computing the linear combination of the samples using the selected weights to produce the estimate.

4. The method of claim 1, wherein determining an update factor comprises:

obtaining an expected sample; and subtracting the estimate from the expected sample to produce the error; and multiplying the error by a step size to produce the update factor.

5. The method of claim 4, wherein the expected sample is one of a training sample and a decision sample.

6. The method of claim 5, wherein the training sample is obtained from a training process.

7. The method of claim 5, wherein the decision sample is a quantized value of the estimate at a predetermined discrete level.

8. The method of claim 1, wherein updating the weights comprises:

generating update products by multiplying the input samples with the update factor; and generating the updated weights by adding the update. products to the corresponding weights.

9. The method of claim 2, wherein computing the sign indicators comprises:

extracting a sign bit from the sample value to assign a sign value to the corresponding sign indicator.

10. The method of claim 9, further comprising:

determining a sign permutation vector having a vector length of $2^J$;

determining a relative sign permutation of the samples among $2^J$ different sign permutations.

11. An apparatus for equalizing a signal in a communication system, the signal being represented by samples at a time instant, the apparatus comprising:

a sign permutation filter to filter the samples;

an estimator coupled to the filter to determine an estimate of the signal by a linear combination of the samples with corresponding weights;

an update factor calculator coupled to the estimator to determine an update factor based on an error of the estimate; and an updating circuit coupled to the estimator and the update factor calculator to update the weights based on the update factor to minimize the error.

12. The apparatus of claim 11, wherein the filter comprises:

sign indicators coupled to receive the input samples to compute the signs of the input samples.

13. The apparatus of claim 12, wherein the estimator comprises:

a weight selector coupled to the sign permutation filter to select the weights based on the sign indicators;

a linear combination circuit coupled to the weight selector to compute the linear combination of the samples using the selected weights, the linear combination circuit producing the estimate.

14. The apparatus of claim 11, wherein the update factor calculator comprises:

a subtractor to subtract the estimate from an expected sample to produce the error; and a multiplier coupled to the subtractor to multiply the error by a step size to produce the update factor.

15. The apparatus of claim 14, wherein the expected sample is one of a training sample and a decision sample.

16. The apparatus of claim 15, wherein the training sample is obtained from a training process.

17. The apparatus of claim 15, wherein the decision sample is a quantized value of the estimate at a predetermined discrete level.

18. The apparatus of claim 11, wherein the updating circuit comprises:

a multiplier coupled to the update factor calculator to generate update products by multiplying the input samples with the update factor;

an adder coupled to the multiplier to generate the updated weights by adding the update products to the corresponding weights.

19. The apparatus of claim 12, wherein the sign indicators comprises:

a sign bit extractor to assign first and second sign values to the sign indicator if the sample value is non-negative and negative, respectively.

20. The apparatus of claim 19, further comprising:

a sign permutation vectorizer coupled to the sign bit extractor to determine a sign permutation vector having a vector length of $2^J$; and a relative sign permutator coupled to the permutation vectorizer to determine a relative sign permutation of the samples among $2^J$ different sign permutations.

21. A system comprising:

a receiver to receive a signal;

a sampler and quantizer coupled to the receiver to sample and quantize the signal into digital samples; and an equalizer coupled to the sampler and quantizer to equalize the signal, the equalizer comprising:

a sign permutation filter to filter the samples;

an estimator coupled to the filter to determine an estimate of the signal by a linear combination of the samples with corresponding weights;

an update factor calculator coupled to the estimator to determine an update factor based on an error of the estimate; and an updating circuit coupled to the estimator and the update factor calculator to update the weights based on the update factor to minimize the error.

22. The system of claim 21, wherein the filter comprises:

sign indicators coupled to receive the input samples to compute the signs of the input samples.

23. The system of claim 22, wherein the estimator comprises:

a weight selector coupled to the sign permutation filter to select the weights based on the sign indicators;

a linear combination circuit coupled to the weight selector to compute the linear combination of the samples using the selected weights, the linear combination circuit producing the estimate.

24. The system of claim 21, wherein the update factor calculator comprises:
   a subtractor to subtract the estimate from an expected sample to produce the error; and
   a multiplier coupled to the subtractor to multiply the error by a step size to produce the update factor.

25. The system of claim 24, wherein the expected sample is one of a training sample and a decision sample.

26. The system of claim 25, wherein the training sample is obtained from a training process.

27. The system of claim 25, wherein the decision sample is a quantized value of the estimate at a predetermined discrete level.

28. The system of claim 21, wherein the updating circuit comprises:
   a multiplier coupled to the update factor calculator to generate update products by multiplying the input samples with the update factor;
   an adder coupled to the multiplier to generate the updated weights by adding the update products to the corresponding weights.

29. The system of claim 22, wherein the sign indicators comprises:
   a sign bit extractor to assign first and second sign values to the sign indicator if the sample value is non-negative and negative, respectively.

30. The system of claim 29, further comprising:
   a sign permutation vectorizer coupled to the sign bit extractor to determine a sign permutation vector having a vector length of $2^J$; and
   a relative sign permutator coupled to the permutation vectorizer to determine a relative sign permutation of the samples among $2^J$ different sign permutations.

* * * * *